US005367599A

United States Patent [19]

Okada

[11] Patent Number: 5,367,599

[45] Date of Patent: Nov. 22, 1994

[54] ELECTRIC SHAVER IN WHICH MOTOR ROTATIONAL SPEED IS CONTROLLED ACCORDING TO BEARD THICKNESS

[75] Inventor: Tetsuya Okada, Sumoto, Japan

[73] Assignee: Sanyo Electrical Co., Ltd., Osaka, Japan

[21] Appl. No.: 67,074

[22] Filed: May 26, 1993

[30] Foreign Application Priority Data

May 27, 1992 [JP] Japan ................................ 4-134952
Sep. 9, 1992 [JP] Japan ................................ 4-240641

[51] Int. Cl.[5] ................................ H02P 5/17

[52] U.S. Cl. ................................ 388/809; 388/815

[58] Field of Search ................................ 388/809–815, 388/907.5; 30/40, 42–46

[56] References Cited

U.S. PATENT DOCUMENTS 5,274,735 12/1993 Okada .

FOREIGN PATENT DOCUMENTS 62-79084 4/1987 Japan .
4-236978 8/1992 Japan .
4-250188 9/1992 Japan .
5-38387 2/1993 Japan .

*Primary Examiner*—William M. Shoop, Jr.
*Assistant Examiner*—Brian Sircus
*Attorney, Agent, or Firm*—Wenderoth, Lind & Ponack

[57] ABSTRACT

An electric shaver is provided with a motor to drive a cutter, a motor current sensing circuit, and a computation circuit which processes an output from the current sensing circuit. The computation circuit computes beard thickness, and a set range of motor rotational speed regulation according to beard thickness to lower rotational speeds for thin beards and to higher rotational speeds for thick beards, and thereby rotates the motor at optimum speeds according to beard thickness.

9 Claims, 10 Drawing Sheets

EXAMPLE OF CHANGING LOAD CURRENT PATTERN WHILE SHAVING

EXAMPLE OF CHANGING LOAD CURRENT PATTERN WHILE SHAVING

ELECTRIC SHAVER IN WHICH MOTOR ROTATIONAL SPEED IS CONTROLLED ACCORDING TO BEARD THICKNESS

BACKGROUND OF THE INVENTION

This invention relates to an electric shaver in which a rotational speed is optimally controlled during shaving, and more particularly, to an electric shaver that can shave people with beards having beards ranging from thin to thick under optimum conditions.

An electric shaver with no motor rotational speed control increases rotational speed under no load and decreases rotational speed under load. This type of electric shaver rapidly rotates its motor under no load wasting electric power. Wasteful use of electric power can be avoided by reducing no load rotational speed. To realize this, an electric shaver is known that controls motor rotational speed. Such an electric shaver is provided with a motor rotational speed sensing means. The motor rotational speed is controlled to a constant speed by the motor rotational speed sensing means and a motor rotation control means.

This type of electric shaver can prevent the wasteful use of electric power under no load conditions. However, it cannot regulate rotational speed in an optimal fashion according to the user's beard thickness. In the case of a thin bearded person, shown in FIG. 10(*a*) since the motor is driven at a constant rotational speed, whiskers are not guided into the shaver well. In addition, there is also a problem of susceptibility to razor burn after shaving. Since the rotational speed is maintained constant during shaving, as shaving progresses the same problems of poor whisker guidance and razor burn exist when used by a thick bearded person shown in FIG. 10(*b*).

To solve these problems, the present inventor developed an electric shaver to change motor rotational speed according to beard conditions (U.S. application Ser. No. 808,431, filed Dec. 16, 1991, now U.S. Pat. No. 5,274,735). In this electric shaver, motor load current is sensed to control rotational speed. When motor load current becomes smaller, motor rotational speed is reduced. Motor load current decreases when the amount of whiskers cut by the blades decreases. For this reason motor rotational speed decreases as shaving progresses. As motor rotational speed decreases during shaving, whiskers are guided into the shaver better for a cleaner shave. Razor burn is also reduced. This electric shaver has the characteristic that at first motor rotational speed is high and whiskers are easily cut (rough shaving), and near the end of shaving motor rotational speed is low (finishing).

In this type of electric shaver, motor load current is sensed and motor rotational speed is controlled immediately after that. At the beginning of shaving many whiskers are cut by the blades, motor rotational speed is large, and consequently motor rotational speed is increased. As shaving progresses, the number of whiskers cut by the blades decreases and motor rotational speed is reduced. However, in the practical application of the electric shaver, the face is not shaved over its entire area at one time. The entire face is shaved by repetitive rough shaving and finer finishing part by part.

FIG. 1 shows motor load current during shaving. As shown in this figure, load current has an overall decreasing trend while increasing and decreasing. Therefore, motor rotational speed also has an overall decrease with small increases and decreases. FIG. 2 shows changing motor rotational speed during shaving. As shown in this figure, motor rotational speed is varied over a given range. In FIG. 2, motor rotational speed of the electric shaver is controlled over a range from 6000 rpm to 7500 rpm.

Since the rotational speed of this electric shaver decreases as shaving progresses, razor burn protection and whisker guidance into the blades can be improved, but when used by a thick bearded person cutting ability is lacking, and when used by a thin bearded person razor burn can still occur. In particular, when rotational speed is adjusted for thick bearded people, razor burn increases for thin bearded people, and when rotational speed is adjusted for thin bearded people, cutting ability becomes worse for thick bearded people.

The present invention was developed to solve these problems, and it is thus a primary object of the present invention to provide an electric shaver with rotational speed controlled according to the beard that can shave both thick bearded people and thin bearded people under optimum conditions.

The above and further objects and features of the invention will be more fully apparent from the following detailed description with reference to the accompanying drawings.

SUMMARY OF THE INVENTION

The electric shaver with rotational speed controlled according to this invention comprises a motor to drive cutting blades, a rotation control means to control motor rotational speed, a current sensing means to sense motor load current, and a computation circuit to operate on the output signal from the current sensing means.

The computation circuit computes beard thickness and changes the set adjustment range of motor rotational speed depending on beard thickness The set range of motor rotational speed adjustment is made higher when a thick bearded person uses the shaver and lower when a thin bearded person uses the razor. Beard thickness is computed by averaging motor rotational speed over, for example, one to several revolutions. As shown in FIG. 3, the load current waveform for a person with a thick beard B is different than that for a person with a thin beard A. Namely, the average value of current is larger for a thick bearded person's current waveform than it is for a thin bearded person's.

DETAILED DESCRIPTION OF THE INVENTION

Figure 4:
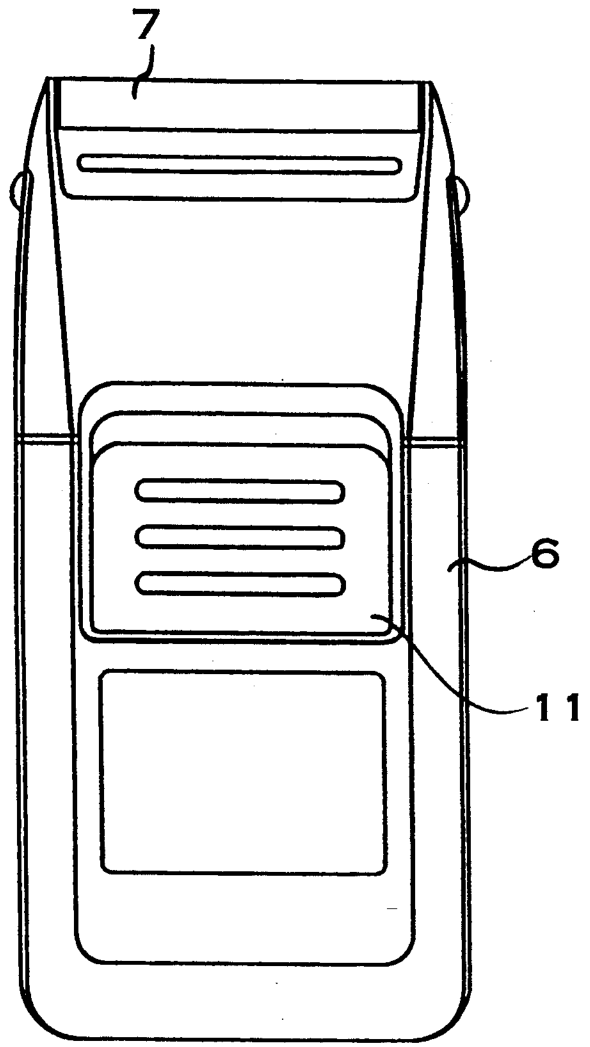
FIG. 4 is a front view showing one embodiment of the electric shaver.
Figure 5:
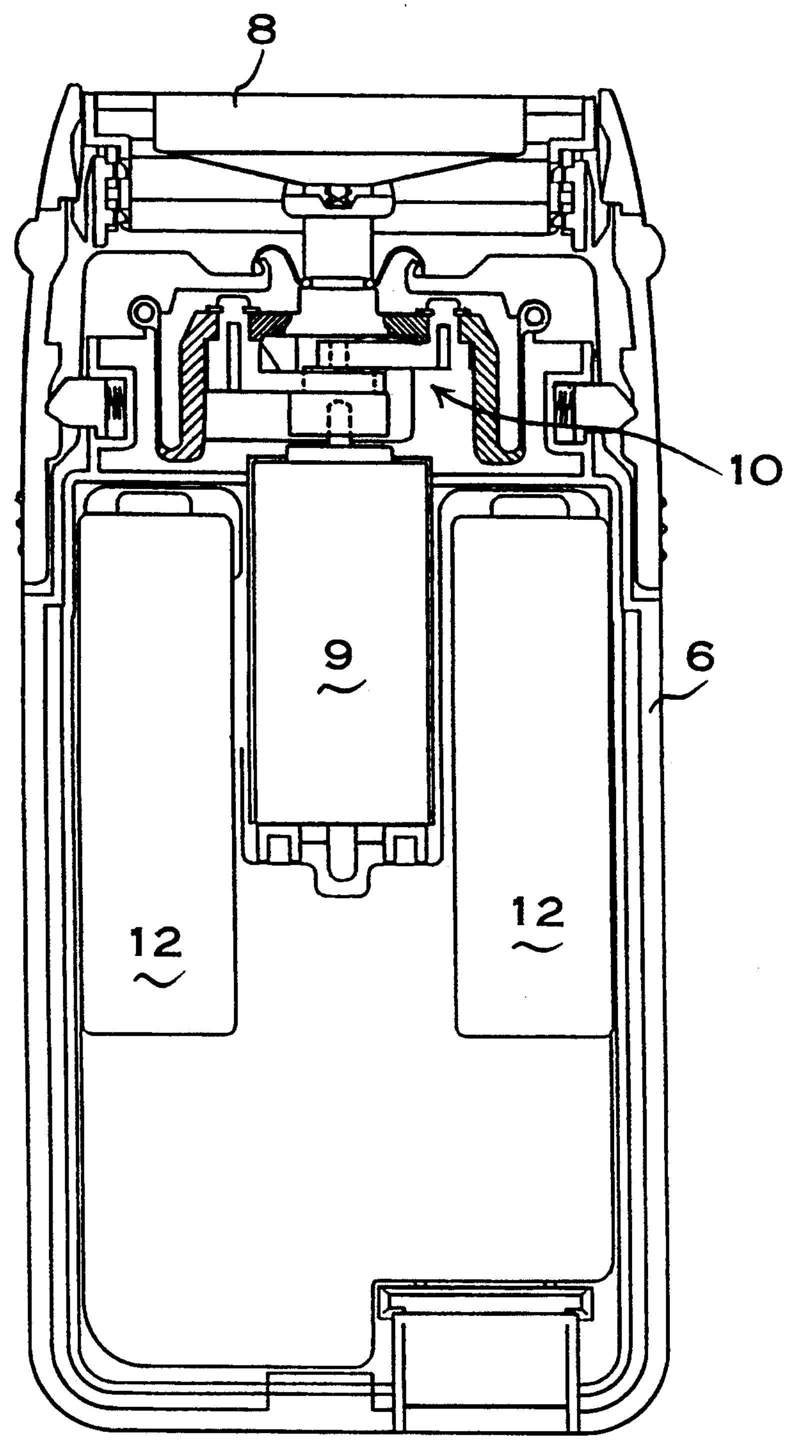
FIG. 5 is a front cross-sectional view of the electric shaver shown in FIG. 4.

Turning to FIG. 4 and FIG. 5, the electric shaver shown is provided with an outer cutter 7 at the extreme top of the casing 6. An inner cutter 8 pushes, in a spring loaded fashion, against the inner surface of the outer cutter 7. The inner cutter 8 is connected to a driving mechanism 10 that converts motor 9 rotational motion into back and forth movement. The motor 9 is connected to a battery 12 through a switch 11.

Figure 6:
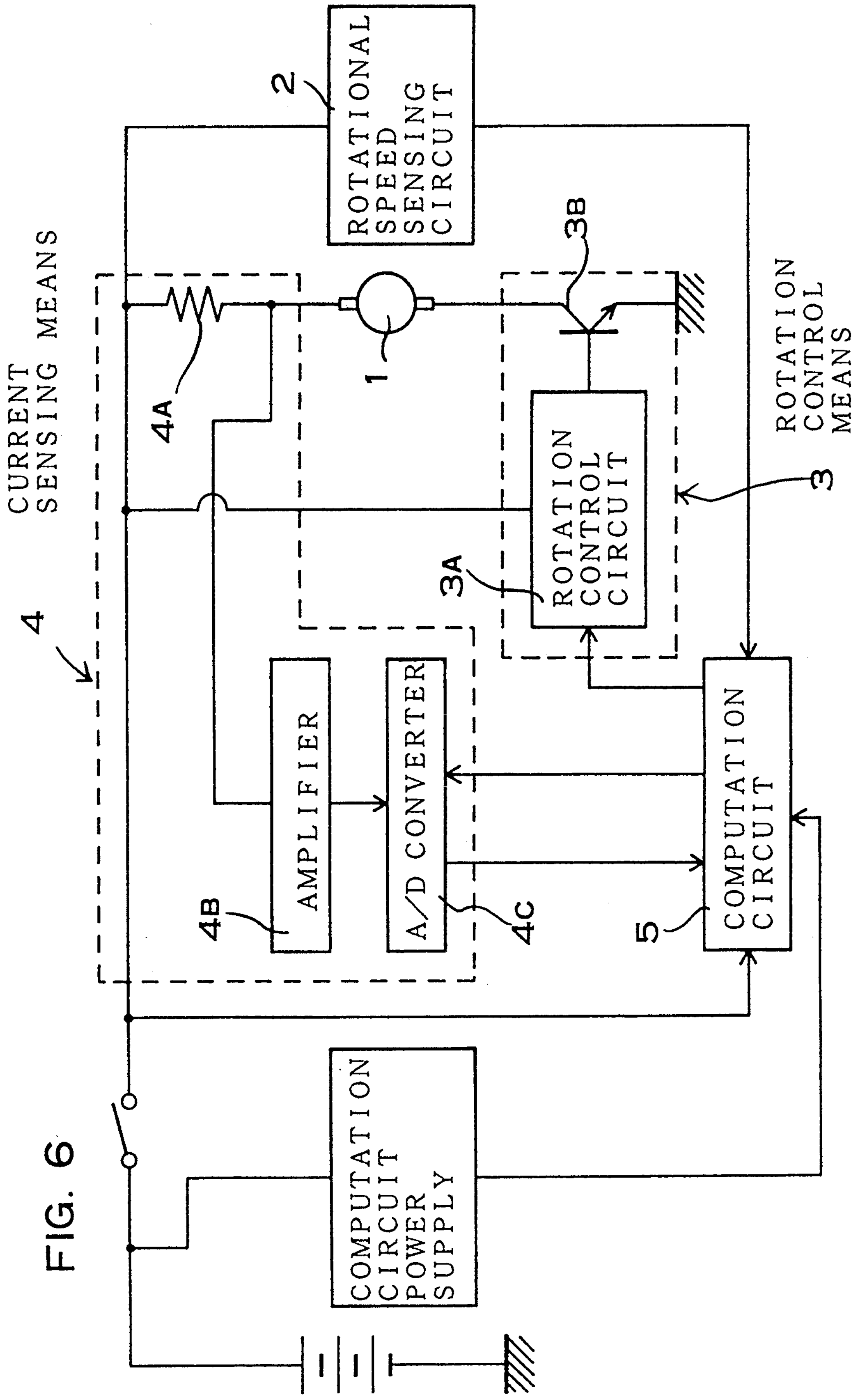
FIG. 6 is a block diagram showing the electric circuit of one embodiment of the electric shaver of the present invention.

FIG. 6 shows the circuit diagram for the electric shaver shown in FIG. 4 and FIG. 5. The electric shaver shown in this figure is provided with a motor 1 to drive the cutter, a rotational speed sensing circuit 2 to sense motor 1 rotational speed, a rotation control means 3 to control motor rotational speed, a current sensing means 4 to sense motor 1 load current, and a computation circuit 5 to operate on the output signal from the current sensing means 4.

The rotational speed sensing circuit 2 uses, for example, a hall effect device and inputs a signal that is a function of motor 1 rotational speed to the computation circuit 5.

The rotation control means 3 is made up of a rotation control circuit 3A and a transistor 3B. The rotation control circuit 3A controls the base current of transistor 3B to control the rotational speed of the motor 1. The rotation control circuit 3A regulates transistor 3B emitter to collector resistance by regulating the amount of current flow in the base. Motor 1 rotational speed can be controlled by changing the emitter to collector resistance of transistor 3B. When base current becomes large, the emitter to collector resistance of transistor 3B becomes small. When emitter to collector resistance becomes small, motor 1 current increases and rotational speed increases. In the opposite direction, when base current becomes small, transistor 3B emitter to collector resistance increases, motor 1 current decreases, and rotational speed decreases.

The current sensing means 4 is provided with a current sensing resistor 4A in series with the motor 1, an amplifier 4B to amplify the voltage developed across the two terminals of the current sensing resistor 4A, and an analog to digital (A/D) converter 4C to convert the output signal from the amplifier 4B to a digital value. A voltage proportional to the motor 1 load current is developed across the two terminals of the current sensing resistor 4A. After amplification of the voltage across the current sensing resistor 4A by amplifier 4B, the voltage is converted to a digital value by the A/D converter 4C. The output signal from the A/D converter 4C is input to the computation circuit 5.

A current sensing means, in which the voltage across the current sensing resistor 4A terminals is amplified by amplifier 4B and input to the A/D converter 4C, is characterized in that the value of the current sensing resistor 4A can be made small. The A/D converter 4C samples amplifier 4B output over a given period, converts the output to a digital value, and inputs it to the computation circuit 5. The computation circuit 5 inputs a trigger pulse to the A/D converter 4C to set the timing for conversion of the amplifier 4B output to digital format by the A/D converter 4C.

Figure 1:
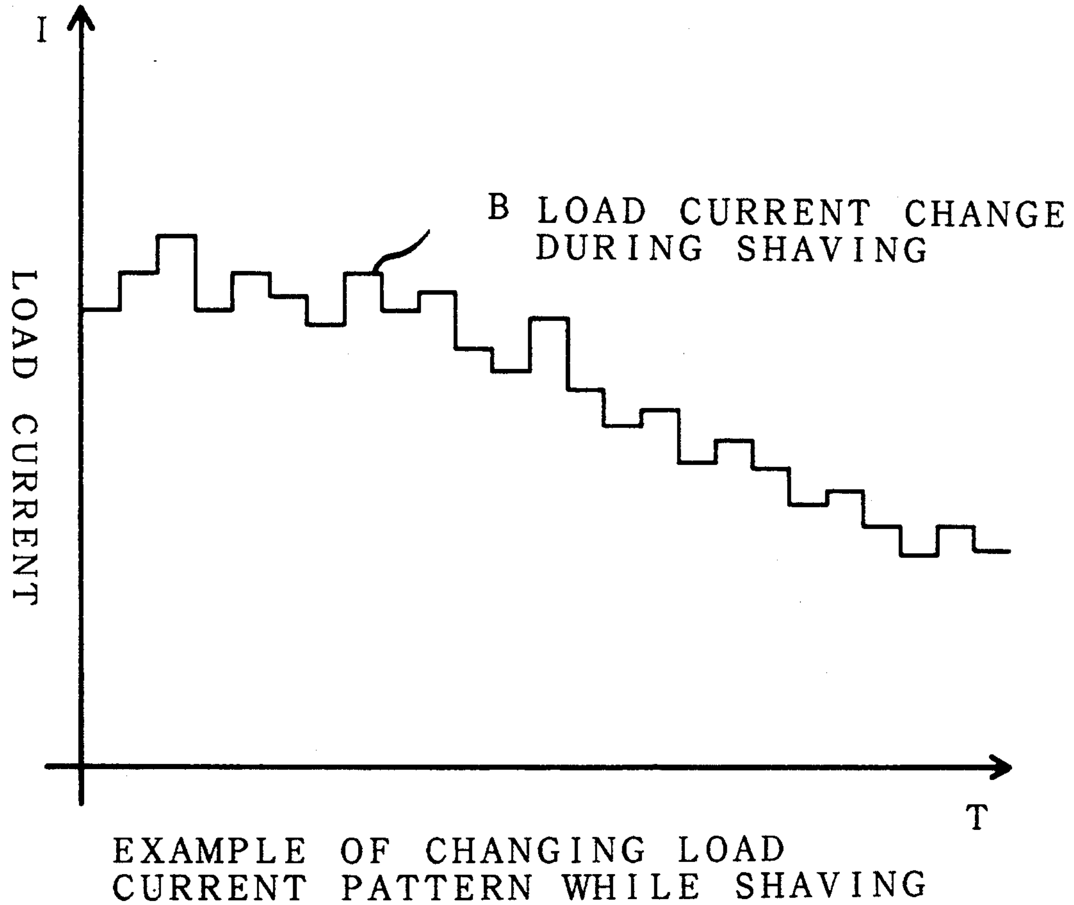
FIG. 1 is a graph showing a motor current waveform.
Figure 2:
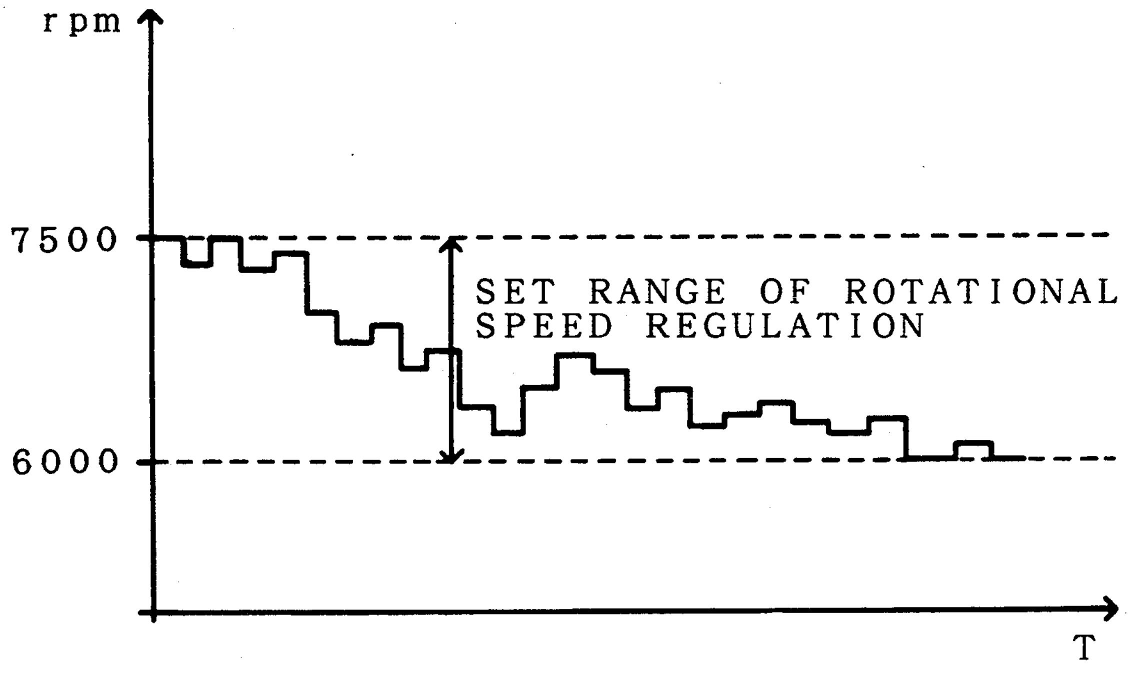
FIG. 2 is a graph showing motor rotational speed variation in a prior art electric shaver.
Figure 3:
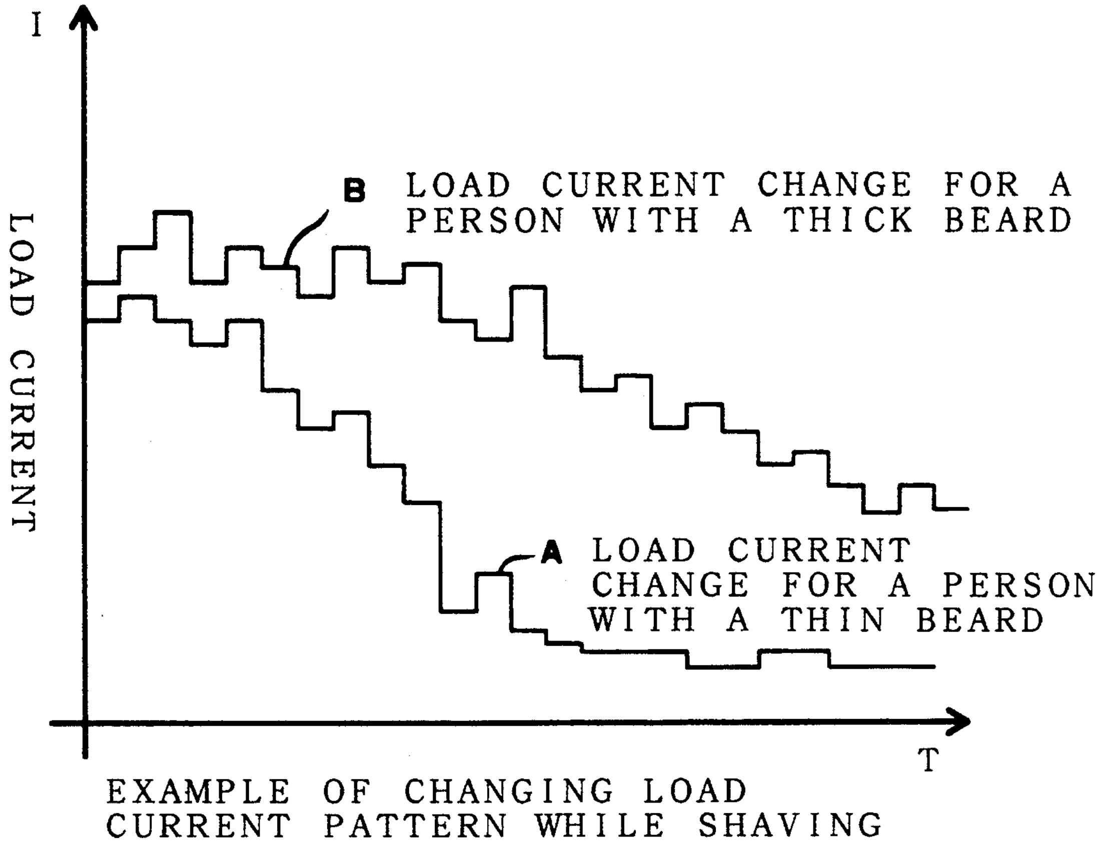
FIG. 3 is a graph showing motor load current during use by a thick bearded person and during use by a thin bearded person.

The computation circuit 5 comprises a microcomputer. The computation circuit 5 processes the input signal from the current sensing means and determines motor 1 rotational speed. When a load is put on the motor 1, its current increases. Motor load current increases in proportion to the amount of whiskers. FIG. 3 shows load current during shaving for thick and thin beards. Curve B shows load current during shaving of a thick beard and curve A shows load current during shaving of a thin beard. As seen here, the load current sensing means output signal is related to the quantity of beard, and therefore beard quantity can be detected.

The computation circuit 5 considers three factors to determine motor rotational speed. The first factor is the size of the current just prior to rotational speed change and its amount of change, the second factor is the amount of time passed since shaving commenced, and the third factor is beard thickness.

The computation circuit 5 considers the first factor, the current value I output from the current sensing means and the difference ΔI from the previous current value, to determine rotational speed. The computation circuit 5 outputs a signal corresponding to this rotational speed to the rotation control means.

Fuzzy logic based on fuzzy rule tables is discussed here. The computation circuit compares the measured value of load current I with a given reference value. When results of this comparison show the measured value to be larger than the reference, the degree of largeness is judged, and an attribute in the range from 0 to 1 is assigned. When the measured value I is sufficiently larger than the reference value, the attribute is 1. Similarly, an attribute in the range from 0 to 1 is assigned to the set of measured values I approximately equal to the reference value and for measured values I less than the reference value.

The computation circuit also determines an attribute in the range from 0 to 1 for the set of negative, zero, and positive ΔI (the difference in measured value I from the previous interval). For example, referring to Table 1, if the measured value I is larger than the reference and has an attribute of 1, and the difference ΔI between the measured value and that of the previous interval is positive with an attribute of 1, then the computation circuit outputs a P (positive) signal based on the fuzzy rule table. The P signal is a command to false the motor rotational speed by 300 rpm. Commands for each attribute of 1 in the fuzzy rule table is set ahead of time.

Tables 1, 2, and 3 are fuzzy rule tables with rules changed according to motor rotational speed.

Table 1 shows the fuzzy rules for the case of a motor rotational speed of 7200 rpm or greater.

TABLE 1

| I\ ΔI | negative | zero | positive |
|---|---|---|---|
| large | Z | Z | P |
| medium | Z | N | P |
| small | N | NB | Z |

Table 2 shows the fuzzy rules for the case of motor rotational speed between 6500 rpm and 7200 rpm.

TABLE 2

| I\ΔI | negative | zero | positive |
|---|---|---|---|
| large | Z | Z | PB |
| medium | Z | Z | P |
| small | Z | N | Z |

Table 3 shows the fuzzy rules for the case of a motor rotational speed of 6500 rpm or less.

TABLE 3

| I\ΔI | negative | zero | positive |
|---|---|---|---|
| large | Z | PB | PB |
| medium | Z | Z | PB |
| small | N | N | Z |

The symbols in Tables 1, 2, and 3 have the following meanings.

PB (Positive Big) increase motor rotational speed by 600 rpm

P (positive) increase motor rotational speed by 300 rpm

Z (Zero) maintain present motor rotational speed

N (Negative) decrease motor rotational speed by 50 rpm

NB (Negative Big) decrease motor rotational speed by 150 rpm

In this fashion, fuzzy logic is used by the computation circuit to vary motor rotational speed depending on attributes of the size of the load current I and the difference in load current from its previous value ΔI. In other words, the computation circuit judges the degree of agreement of an attribute with that of 1 and that degree of agreement is reflected in the output signal to precisely regulate motor rotational speed.

The amount of change for decreasing motor rotational speed is less than that for increasing motor rotational speed to prevent the user from mistaking a sudden decrease in motor rotational speed due to a sharp reduction in whiskers for a sudden loss of battery power or for a malfunction in the driving circuitry.

Figure 7:
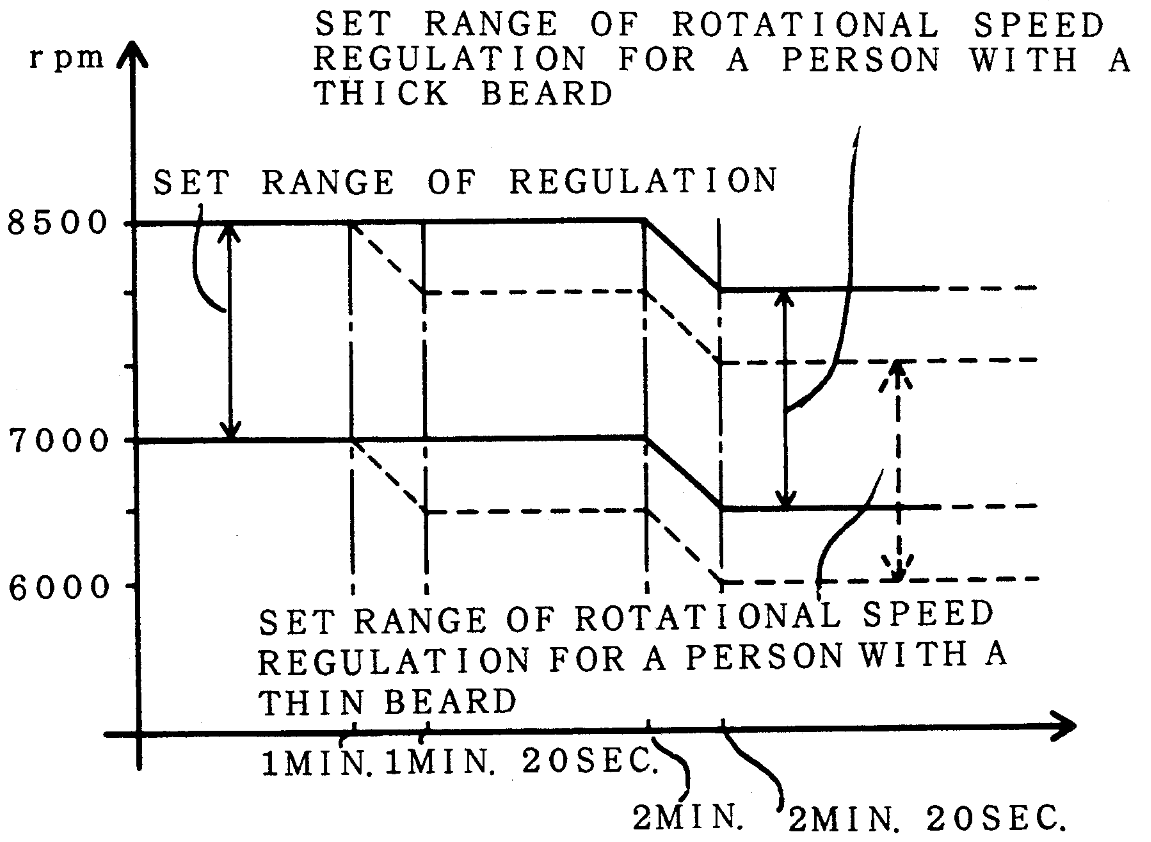
FIG. 7 is a graph showing change with time of the set range of regulation of motor rotational speed for an embodiment of the electric shaver of the present invention.

The computation circuit 5 also considers the second factor and gradually reduces rotational speed after a prescribed time has passed since shaving commenced. In FIG. 7, rotational speed is forced 500 rpm lower over a 20 sec interval after a prescribed time. According to the second factor, after a prescribed time lapse the computation circuit 5 forces the rotational speed determined by the first factor 500 rpm lower. As shown in this figure, control changes the set range of motor rotational speed regulation considering the third factor of beard thickness. Rotational speed is lowered by 500 rpm after 1 min and again after 2 min for a person with a thin beard, but is only lowered after 2 min for a person with a thick beard. The set range of motor rotational speed regulation shown in this figure is initially set the same for both thick and thin beards at 7000 rpm to 8500 rpm. However, when a person with a thin beard uses the razor, the range of rotational speed regulation drops 500 rpm to 6500 rpm to 8000 rpm after 1 min, and then drops another 500 rpm to 6000 rpm to 7500 rpm after 2 min. When a person with a thin beard uses the razor, rotational speed does not drop after 1 min. After 2 min, the range of rotational speed regulation drops 500 rpm to 6500 rpm to 8000 rpm.

As shown in FIG. 7, the computation circuit gradually lowers the set range of motor rotational speed regulation as a function of time according to beard thickness. In an electric shaver that changes the set range of rotational speed regulation in this fashion as a function of beard thickness and time, the rotational speed is adjusted lower as the end of the shave is approached resulting in ideal shaving conditions. However, in the electric shaver of the present invention it is not always necessary to lower the set range of regulation with time passage. It is possible to change the set range of motor rotational speed regulation for thick and thin bearded people, but to maintain that same set range of regulation from the beginning to the end of the shave. For example, it is possible to have a set range of motor rotational speed regulation from beginning to end of 6500 rpm to 8500 rpm when used by a thick bearded person and of 6000 rpm to 8000 rpm when used by a thin bearded person. Further, it is also possible to control motor rotational speed with different fuzzy rule tables for people with thick and thin beards.

The computation circuit 5 processes the current waveform for one shave and judges the user's beard thickness. For cases when there is considerable error in measurement for one shave, beard thickness is judged from current waveforms for several shaves. As shown in FIG. 3, when a person with a different beard thickness uses the shaver, the motor load current waveform changes. When a thick bearded person uses the shaver, time is required for the current to decrease as shown by curve B. When a thin bearded person uses the shaver, shaving is finished quickly and current drops rapidly as shown by curve A. Consequently, the thickness of the beard of the person using the shaver can be determined by the computation circuit by averaging current over one or several shaves.

The computation circuit that controls rotational speed using motor load current can also determine beard thickness by sensing motor rotational speed. This is because the motor's load is greater for thick bearded people than it is for thin bearded people, and motor rotational speed therefore controlled to a higher speed. When determining beard thickness by sensing current or rotational speed, the set range of regulation can be changed accordingly by rearranging the current waveform or the rotational speed waveform in descending order from large to small.

Figure 8:
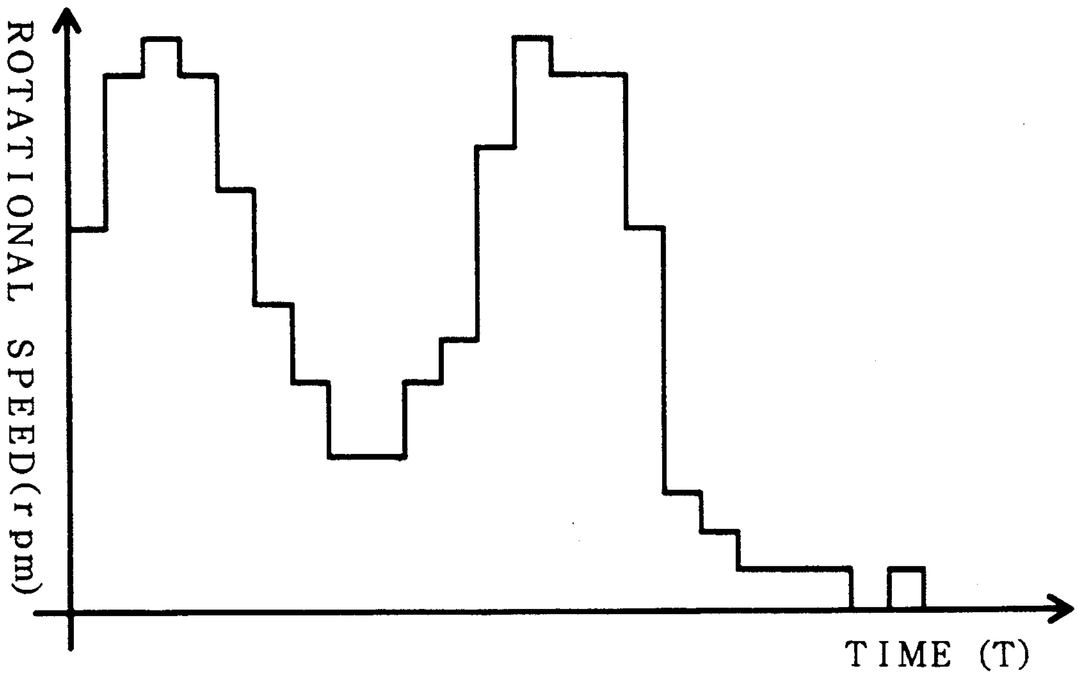
FIG. 8 is a graph showing a motor rotational speed waveform for the case when the left and right sides of the face are shaved separately.

A method of determining beard thickness by sorting the rotational speed waveform from large to small is detailed in the following. In the case where the left and right sides of the face are shaved separately, rotational speed changes as shown in FIG. 8. FIG. 8 shows that rotational speed again becomes large when shaving shifts from one side of the face to the other. Since beard thickness information is embedded in the motor rotational speed, beard thickness can be determined by sensing this type of motor rotational speed.

Figure 9:
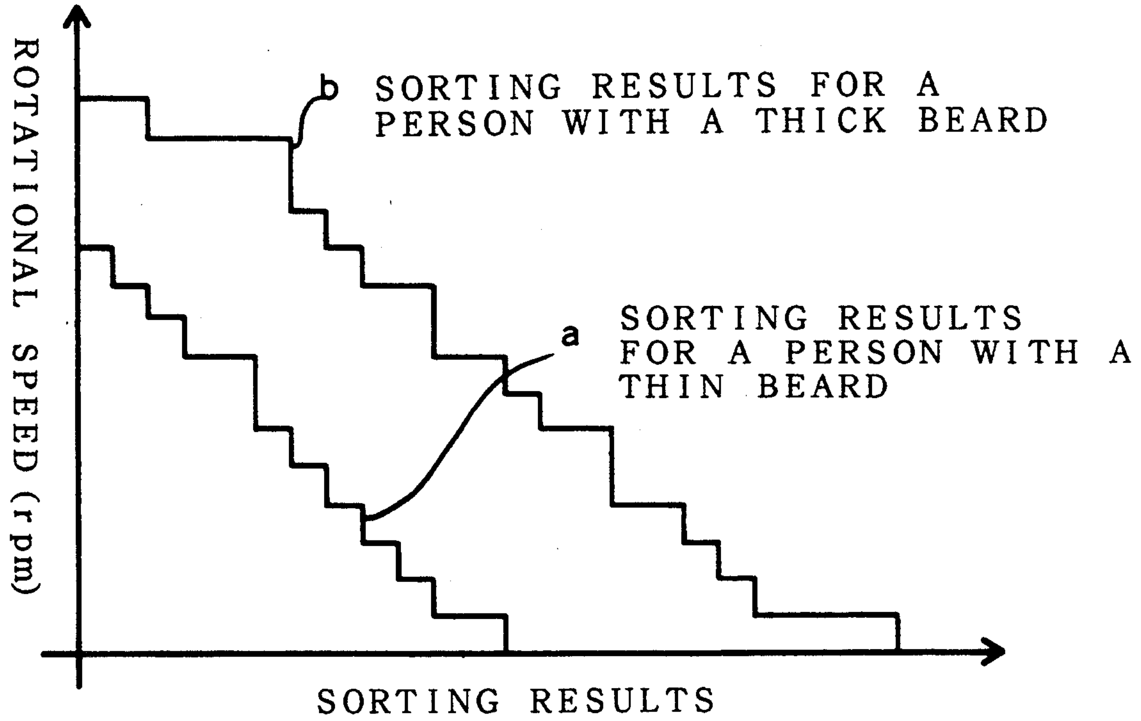
FIG. 9 is a graph showing a motor rotational speed waveform rearranged in order of descending rotational speed.
Figure 10A:
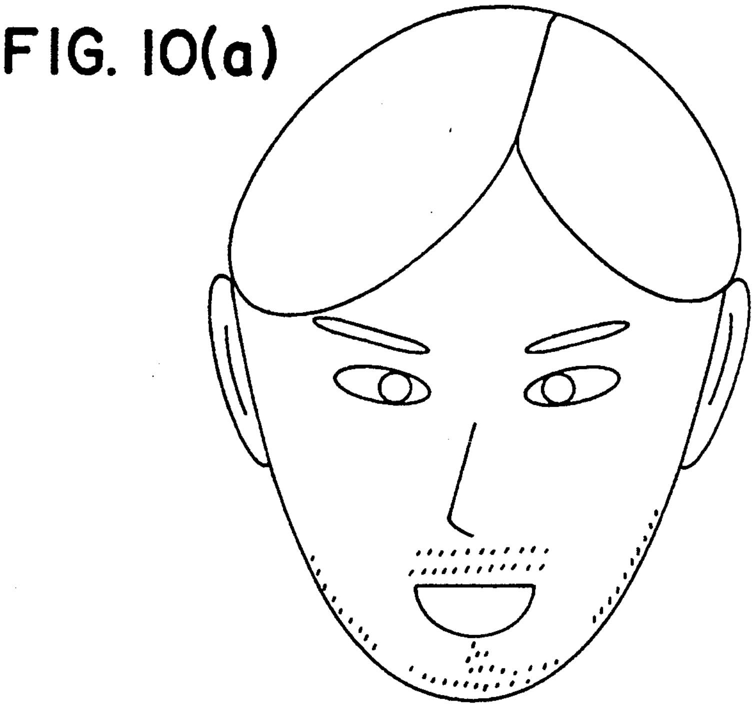
FIGS. 10(*a*) and 10(*b*) respectively depict a person having a relatively thin beard and a person having a relatively thick beard.
Figure 10B:
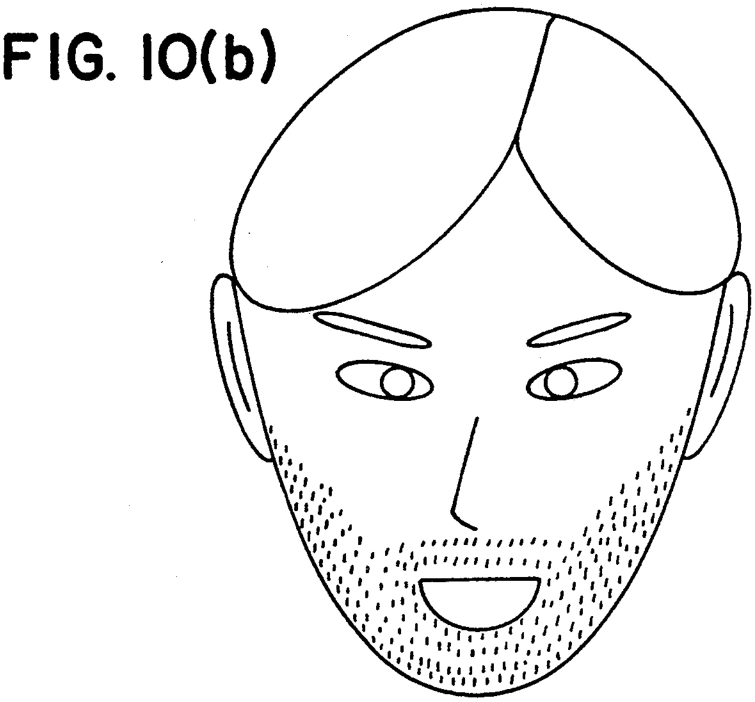

The computation circuit 5 processes motor rotational speed data detected by the rotational speed sensing circuit 2 and determines beard thickness. FIG. 9 is rotational speed data sorted by size from large to small. A clear difference between the rotational speed for a thick bearded person (b) and a thin bearded person (a) can be seen in this graph. Even when rotational speed once again becomes large as in FIG. 8 or even with different shaving techniques, beard thickness can be easily judged by sorting rotational speed from large to small. The computation circuit 5 stores rotational speed data, and has the functionality to sort that data from large to small and accurately determine beard thickness. However, the computation circuit can also sort rotational speed from small to large and determine beard thickness. The means of controlling rotational speed for the electric shaver that achieves optimum shaving based on the first factor of current value immediately after rotational speed change and the change in that current value, the second factor of time passed since shaving commenced, and the third factor of beard thickness is described as follows. First, when the electric shaver switch is turned on and shaving is commenced, motor rotational speed is adjusted while sensing load current by the fuzzy logic of the first factor. During this time, the computation circuit stores motor rotational speed data. After shaving when the switch is turned off, the computation circuit sorts the motor rotational speed data from large to small and determines beard thickness. When beard thickness determined, the range of rotational speed variation is set according to beard thickness. The next time the switch is turned on to shave, rotational speed is controlled over the range determined by the previous shave. This process is repeated by turning the switch on and off. Consequently, the range of rotational speed variation is corrected and reset by determination of beard thickness each shave. However, beard thickness is not determined by just one shave, but rather is determined by averaging rotational speed waveforms over several shaves. In this fashion, the accuracy of beard thickness determination is still further improved.

By detecting beard thickness, an electric shaver with the above configuration changes the set range of regulation over which rotational speed can vary for thick bearded people and for thin bearded people. In other words, motor rotational speed is changed to a high range of speeds for a thick bearded person and to a low range of speeds for a thin bearded person. Consequently, this electric shaver has the feature that motor rotational speed is controlled to optimum conditions to give each individual a good feeling clean shave whether they have a thick or thin beard. Specifically, thick bearded people can shave under good sharp cutting conditions, and thin bearded people can shave with little chance of razor burn. Since thick bearded people typically have tougher skin than thin bearded people, rotational speed can be increased with little fear of razor burn and good sharp cutting for an invigorating shave. Further, since thin bearded people typically have more sensitive skin, razor burn can be prevented and guidance of whiskers into the razor can be improved by lowering motor rotational speed for a clean shave.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

We claim:

1. An electric shaver in which a motor rotational speed is controlled according to a beard thickness and in which the motor rotational speed is varied within a set range, comprising:

(a) a motor;

(b) a current sensing means for sensing a motor load current;

(c) a rotation control means for controlling the motor rotational speed according to a motor rotational speed command; and (d) a computation circuit for processing an output signal from the current sensing means, for computing a motor load and beard thickness, for selectively establishing the set range of the motor rotational speed in accordance with the computed beard thickness such that the established set range of the motor rotational speed is lower for a computed beard thickness that is relatively thin than for a computed beard thickness that is relatively thick, and for generating the motor rotational speed command according to the computed motor load so as to control the motor rotational speed within the set range.

2. An electric shaver as recited in claim 1, wherein the rotation control means comprises a rotation control circuit and a transistor connected to the motor and controlled by the rotation control circuit.

3. An electric shaver as recited in claim 1, wherein the current sensing means comprises a current sensing resistor connected in series with the motor, an amplifier having an input connected across the current sensing resistor, and an analog to digital (A/D) converter for converting an output of the amplifier to a digital value.

4. An electric shaver as recited in claim 1, wherein the computation circuit is a microcomputer.

5. An electric shaver as recited in claim 4, wherein the computation circuit generates and modifies the motor rotational speed command in accordance with (a) a first factor which is a size of the motor load current and a change in the motor load current immediately before the motor rotational speed command is modified, (b) a second factor which is an amount of time passed since commencement of shaving, and (c) a third factor which is the beard thickness.

6. An electric shaver as recited in claim 5, wherein the computation circuit generates and modifies the motor rotational speed command by applying fuzzy logic to the size of the motor load current and the change in the motor load current immediately before the motor rotational speed command is modified.

7. An electric shaver in which a motor rotational speed is controlled according to a beard thickness and in which the motor rotational speed is varied within a set range, comprising:

(a) a motor;

(b) a current sensing means for sensing a motor load current;

(c) a rotation control means for controlling the motor rotational speed according to a motor rotation speed command; and (d) a rotational speed sensing circuit for sensing the motor rotational speed; and (e) a computation circuit for processing an output signal from the rotational speed sensing circuit, for computing a motor load and beard thickness, for selectively establishing the set range of the motor rotational speed in accordance with the computed beard thickness such that the established set range of the motor rotational speed is lower for a computed beard thickness that is relatively thin than for a computed beard thickness that is relatively thick, and for generating the motor rotational speed command according to the computed motor load so as to control the motor rotational speed within the set range.

8. An electric shaver as recited in claim 7, wherein the computation circuit is a microcomputer which detects beard thickness and determines the motor rotational speed command by sorting sensed rotational speeds from large to small according to their size.

9. An electric shaver as recited in claim 7, wherein the computation circuit is a microcomputer which detects beard thickness and determines the motor rotational speed command by sorting sensed rotational speeds from small to large according to their size.

* * * * *